United States Patent
Draser et al.

(10) Patent No.: US 10,054,251 B2
(45) Date of Patent: Aug. 21, 2018

(54) DEVICE FOR CONDUCTING OIL IN A VEHICLE GEARBOX WITH AT LEAST TWO ELEMENTS WHICH CAN MOVE WITH RESPECT TO ONE ANOTHER AND WITH A SLEEVE

(71) Applicant: Schaeffler Technologies AG & Co. KG, Herzogenaurach (DE)

(72) Inventors: Georg Draser, Nuremberg (DE); Heidi Pscherer, Aurachtal (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 272 days.

(21) Appl. No.: 14/912,555

(22) PCT Filed: Sep. 19, 2014

(86) PCT No.: PCT/DE2014/200485
§ 371 (c)(1),
(2) Date: Feb. 17, 2016

(87) PCT Pub. No.: WO2015/043595
PCT Pub. Date: Apr. 2, 2015

(65) Prior Publication Data
US 2016/0208965 A1    Jul. 21, 2016

(30) Foreign Application Priority Data
Sep. 25, 2013  (DE) .................. 10 2013 219 285

(51) Int. Cl.
*F16L 37/24*   (2006.01)
*F16L 21/08*   (2006.01)
*F16L 27/087*  (2006.01)
*F16H 57/04*   (2010.01)

(52) U.S. Cl.
CPC ............ *F16L 21/08* (2013.01); *F16H 57/043* (2013.01); *F16H 57/0424* (2013.01); *F16H 57/0426* (2013.01); *F16L 27/087* (2013.01)

(58) Field of Classification Search
USPC ........................................................ 285/403
See application file for complete search history.

(56) References Cited

U.S. PATENT DOCUMENTS 4,036,515 A * 7/1977 Karcher ................ F16L 37/133
285/315
4,778,203 A * 10/1988 Bartholomew ..... F16L 37/0987
285/111

(Continued)

FOREIGN PATENT DOCUMENTS

DE   102007048124 B4   11/2009
DE   102011076796 A1   12/2012

*Primary Examiner* — Aaron M Dunwoody
(74) *Attorney, Agent, or Firm* — Brooks Kushman P.C.

(57) ABSTRACT

A device for conducting oil in a vehicle gearbox, wherein the device has at least two elements which can move with respect to one another and at least one sleeve made from steel plate, and the sleeve is arranged here between the elements and at least one of the elements and the sleeve are secured to one another in a positively locking manner, and wherein a first element of the elements is surrounded at least partially by the sleeve and a second element of the elements surrounds the sleeve and the first element at least partially.

11 Claims, 6 Drawing Sheets

(56) References Cited

U.S. PATENT DOCUMENTS

| | | | | |
|---|---|---|---|---|
| 4,953,898 | A | * | 9/1990 | Jorgensen ............. F16L 37/091 285/340 |
| 5,078,434 | A | * | 1/1992 | Coya .................. F16L 37/0982 285/315 |
| 5,732,984 | A | * | 3/1998 | Bartholomew ..... F16L 37/0987 285/319 |
| 6,267,416 | B1 | * | 7/2001 | Ferreira ................ F16L 37/008 285/319 |
| 2002/0140226 | A1 | * | 10/2002 | Salomon-Bahls .. F16L 37/0915 285/307 |
| 2003/0230895 | A1 | * | 12/2003 | Brown .................... F16L 33/02 285/239 |
| 2009/0033086 | A1 | * | 2/2009 | Nishio ................. F16K 15/026 285/18 |
| 2011/0109083 | A1 | * | 5/2011 | Baier ..................... F16B 4/004 285/397 |
| 2013/0221659 | A1 | * | 8/2013 | Marc .................... F16L 19/005 285/81 |

* cited by examiner

DEVICE FOR CONDUCTING OIL IN A VEHICLE GEARBOX WITH AT LEAST TWO ELEMENTS WHICH CAN MOVE WITH RESPECT TO ONE ANOTHER AND WITH A SLEEVE

CROSS-REFERENCE TO RELATED APPLICATIONS

The present application is the United States National Stage Application pursuant to 35 U.S.C. § 371 of International Patent Application No. PCT/DE2014/200485, filed on Sep. 19, 2014, and claims priority to German Patent Application No. 10 2013 219 285.1, filed Sep. 25, 2013, which applications are incorporated by reference in their entireties.

DESCRIPTION

Field of the Invention

The invention concerns a device for conducting oil in a vehicle gearbox, whereby the device exhibits at least two mutually movable elements and at least one sleeve, and the sleeve is disposed between the elements and at least one of the elements and the sleeve are secured to one another in a positive-locking manner, and whereby a first element of the elements is at least partially surrounded by the sleeve and a second element of the elements at least partially surrounds the sleeve. The invention further concerns a sleeve for such a device.

Background of the Invention

Sleeves, which can be used in devices with rotary unions, are described in DE 10 2007 048 124 B4. The device, through which oil is generally conducted as a lubricating and or pressure medium, feeds the oil to lubricating points or pressure cylinders for the purpose of actuating pistons. A rotary union, through which the oil is conducted from a rotating element to a stationary element, or vice versa, is frequently a component of the device. Rotating elements include gear shafts and stationary elements are housings of the gearbox. The device is formed by a sleeve and a housing section of the gearbox. The sleeve is a thin-walled component made of sheet steel. The use of this type of sleeve, in particular in housings made of light metal, can cause the seat of the sleeve to become loose in the course of heating while driving, because, due to the greater thermal expansion coefficient of its material, the housing expands more than the sleeve made of steel. For this reason, in the housing made of light metal, this type of sleeve is secured against rotation by means of at least one locking element.

The channels of the device are bounded either entirely or partially by the material of the housing or the housing section, which, during its manufacturing, has to be prepared in a correspondingly complex and cost-intensive manner. The previously known oil conduits of the state of the art are achieved by incorporating the housing and shafts into the design of the necessary passages. These include longitudinal and transverse bores, and longitudinal, transverse and circumferential grooves that have to be realized by means of complex machining. Seats and sealing surfaces for ring seals also have to be worked in by machining.

DESCRIPTION OF THE INVENTION

The task of the invention is to provide a device and a sleeve for a device, in which the securing of the sleeve is optimized.

The invention provides that the sleeve and at least one of the elements are secured to at least two mutually adjacent tabs, in a positive-locking manner, against rotation about the axis of rotation or symmetry, and/or axial displacement relative to one another. The invention further provides a sleeve designed according to the invention for the device. Each of the tabs of the positive-locking means of securing extends on a root from the wall of the sleeve. The root is a bending edge or forming edge, at which the respective tab is combined with the material of the sleeve as one material, and at which the tab is bent away from the sleeve. Seen from the root, the respective tab extends beyond the surface of the sleeve, radially inward into the interior of the sleeve, or radially outward above the sleeve. The tab is made from a section of the wall of a sleeve preferably configured as a hollow cylinder by separation, whereby the one material-configured connection between the sleeve and the respective lug at the root remains.

In the course of manufacturing the locking element, a section of sheet metal with the contour of the respective lug is cut out of the wall of the sleeve, and then pushed through to the outside or the inside by bending or punching. The tabs then extend from the respective root in a direction different from the wall. As a result of the free punch, after the tab is pushed through, there is a radial aperture in the wall of the sleeve at each of the roots. The aperture adjoins the respective tab. The empty volume of the aperture, no longer filled by the material of the sleeve, is at least as large as, or greater than, the volume exhibited by the material of the tab extending away from the root. The aperture is bounded in at least three directions by the wall of the sleeve. It is bounded in three directions, if the respective tab on the edge of the sleeve is cut free from the material of the sleeve, thereby interrupting the edge in circumferential direction. In the remaining two circumferential or tangential directions and in one axial direction, the aperture is bounded by the material of the sleeve and by the roots. In this case, axial means aligned with the longitudinal axis or the axis of symmetry of the sleeve. Radial means transverse to the longitudinal axis. Circumferential direction and tangential direction is in relation to the circumference of the cross-sectional profile of the sleeve around the longitudinal axis or the axis of symmetry.

The tabs end axially at the edge, whereby the recess interrupts the edge.

The tabs alternatively stand axially behind the edge, whereby the edge is interrupted by the recess, or the tabs are configured between the two opposite edges of the sleeve and the recesses are peripherally bounded by the wall of the sleeve. Tabs are all substantially rectangular or spike-shaped tabs (English Tabs), such as those which are also, for example, configured on locking plates of screw connections.

The root of each tab follows a straight line in axial direction, as a result of which the roots of adjacent tabs are parallel to one another. The roots of the respective tabs alternatively extend at an angle to the longitudinal direction, or are curved as desired.

A further embodiment of the invention provides that the two tabs located adjacent to one another engage, in a positive-locking manner, either into a recess of the inner element or into a recess of the outer element. The outer element surrounds at least a section of the sleeve on the circumferential side. The sleeve and the outer element surround the inner element at least in sections. The outer element preferably exhibits an inner cylindrical surface, which surrounds the sleeve or in which the sleeve is seated. The inner element preferably exhibits an outer cylindrical surface, which is surrounded by the sleeve and/or on which the sleeve is seated. The inner element is pivotable and/or displaceable relative to the outer element about the longitudinal axis or the axis of symmetry. Alternatively, the outer element is pivotable and/or displaceable relative to the inner element. Alternatively, both elements are movable relative to one another in this sense. The outer element is, for example, a housing section of a housing of a vehicle gearbox. The inner element is a shaft or a pin or piston of a vehicle gearbox. It is also conceivable that sealing rings are disposed between the sleeve and inner element.

The sleeve is preferably made of sheet steel. The material of the shafts, pins and pistons is made of steel or light metal. The material of the housing or another outside seated element is steel. Alternatively and preferably, the material is a light metal, the coefficient of thermal expansion of which is greater than that of steel.

A device according to the invention can be mounted easily, because the locking elements can be designed to be flexible and pliable. In addition, the positive fit is made more secure by two tabs.

Material is saved in the manufacturing of the sleeve, because for the cutting of the material of the sleeve, no additional cost has to be taken into consideration for the locking elements. In comparison to locking with just one tab, the contact surface of the positive locking elements is larger, so that the locking cannot be kicked out during extended operation.

DESCRIPTION OF THE DRAWINGS

The invention will be described in more detail in the following by means of design examples. The diagrams, in particular, the details of the design and arrangement of the tabs, are not to scale. The invention is described in the following figures, in which:

FIG. 3b is a view of an alternative arrangement of the arrangement shown in FIG. 3a;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
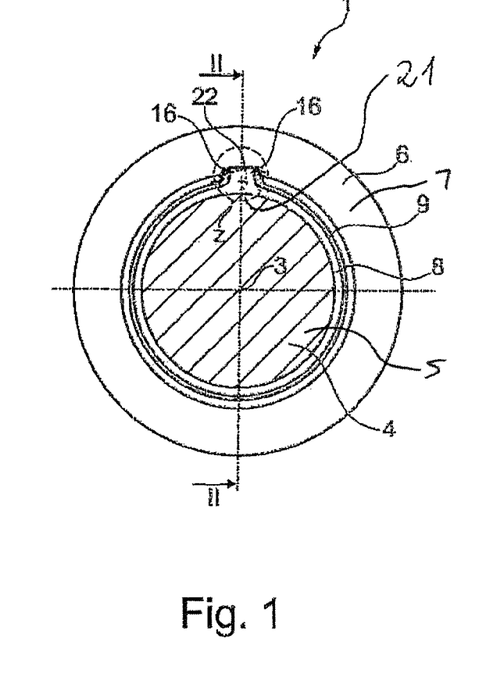
FIG. 1 is a front partial cross-sectional view of a device according to the invention.
Figure 2:
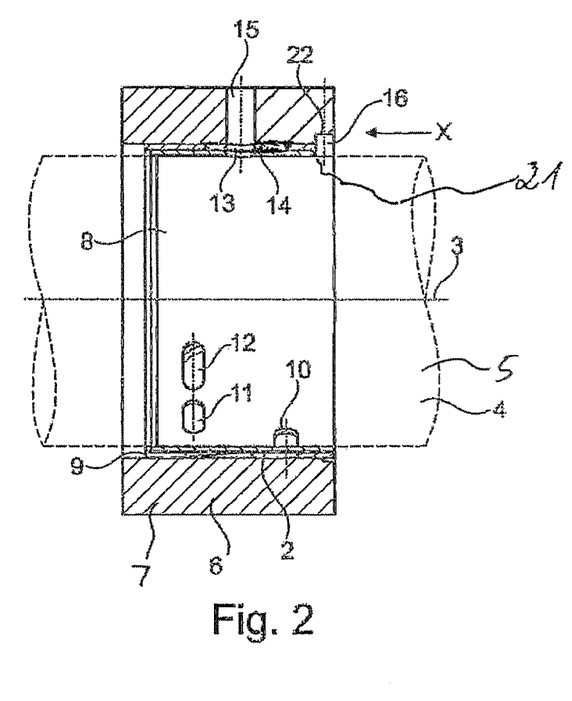
FIG. 2 is a longitudinal sectional view taken generally along line II-II in FIG. 1 along the axis of symmetry of the device.

Device 1 exhibits element 4, which is shaft 5. Device 1 is further provided with element 6, which is housing 7. Sleeves 8 and 9 are disposed between elements 4 and 6. Shaft 5 is movably disposed to be pivotable about axis of symmetry 3 or rotatable relative to housing 7. Sleeve 8 surrounds shaft 5 completely on the circumferential side, and is surrounded by sleeve 9. Sleeve 9 is completely surrounded by second element 6 on the circumferential side. There may or may not be an annular gap between sleeve 9 and element 6. If there is an annular gap, there can also be seals between the sleeve and a shaft. Sleeves 8 and 9 are seated inside one another, and as a composite in housing 7, with an interference fit, a transition fit or a clearance fit. Sleeve 8 is provided with radial clearance holes 10, 11, 12 and 13, which correspond to not depicted channels or oil bores in shaft 5.

Clearance hole 10 leads into channel 2 that is configured as a clearance hole in sleeve 9. Clearance hole 13 opens into channel 14, which extends in circumferential direction in sleeve 9, and which opens into oil bore 15 that is disposed in housing 7 circumferentially offset to clearance hole 13.

Sleeve 8 and sleeve 9, as well as element 6, are secured by at least two mutually adjacent tabs 16, in a positive-locking manner, against rotation about axis of symmetry 3 and, in an axial direction, against displacement relative to one another, in that tabs 16 of sleeve 8 engage through aperture 21 in sleeve 9 into recess 22 in a positive-locking manner.

Figure 3:
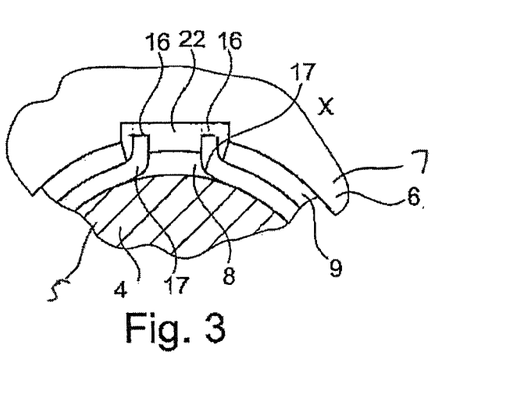
FIG. 3 is a fragmentary view of the device taken generally from perspective X in FIG. 2.

FIG. 3 shows a not to scale detailed representation of the view X from FIG. 2.

Tabs 16 are punched out of the sheet metal of sleeve 8, whereby each of tabs 16 extends at root 17 from wall 18 of sleeve 8. Tabs 16 lie across from one another tangential to the circumference of sleeves 8 and 9, at common radial aperture 19, that is configured on edge 20 of sleeve 8 and was created in the course of the production of tabs 16 by punching and bending of tabs 16 out of wall 18 of sleeve 8. Roots 17, which define the edges of aperture 19 in two circumferential directions, are the bending edges, around which tabs 16 were radially bent out of sleeve 8 in the course of the production of the tabs. In an axial direction, the edge of aperture 19 is bounded by the material of sleeve 8. Edge 20 of sleeve 8 is interrupted on the circumferential side by aperture 19.

Figure 3A:
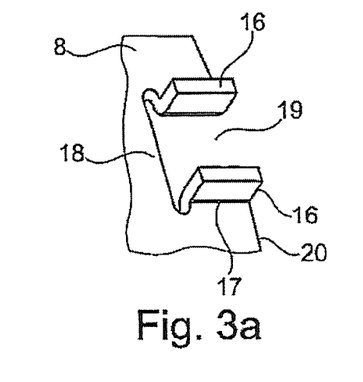
FIG. 3a is a view of the sleeve shown in FIG. 3.

FIG. 3a shows a detailed view of sleeve 8, from which it is seen that tabs 16 end at aperture 19 at the axial height of edge 20 of sleeve 8. The diagrams, in particular the details of the design and arrangement of the tabs, are not to scale.

Figure 3B:
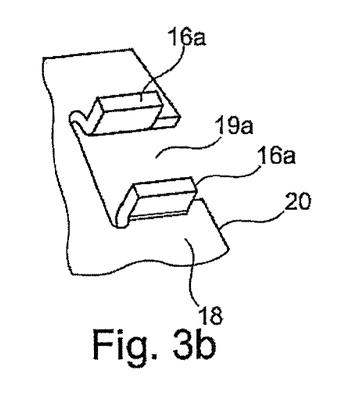

FIG. 3b shows an alternative arrangement to that of FIG. 3a, in which tabs 16a at aperture 19a stand axially behind edge 20 of sleeve 8. The diagrams, in particular the details of the design and arrangement of the tabs, are not to scale.

Figure 4:
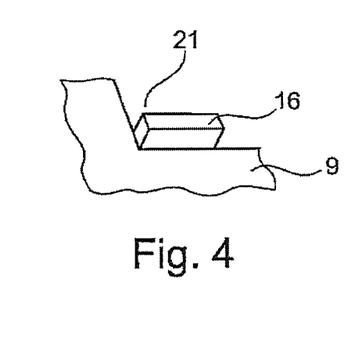
FIG. 4 is a detailed view of the positive-locking means of securing the sleeve of FIG. 3.

FIG. 4 shows a detail of the positive-locking means of securing sleeve 8, sleeve 9 and housing 7. At the height of aperture 19, sleeve 9 exhibits aperture 21. Tabs 16 engage in a positive-locking manner radially through aperture 21, extend above sleeve 9 and together engage into recess 22 in a positive-locking manner. Recess 22 is configured in housing 7, so that sleeve 8 and second sleeve 9 are secured together in element 6.

Sleeves 8 and 9 are made of steel. The material of housing 7 is a light metal alloy, for example, so that the material of sleeves 8 and 9 exhibits a different thermal expansion coefficient than the material of element 6.

Figure 5:
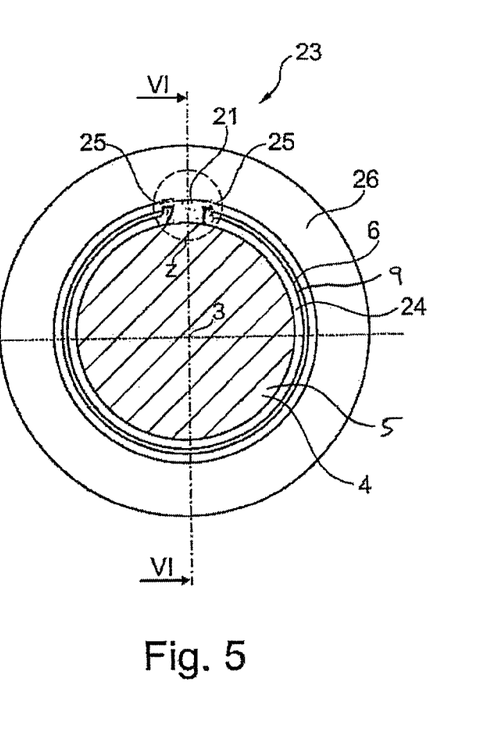
FIG. 5 is a front partial cross-sectional view of a device according to the invention.

FIG. 5 shows device 23 in a frontal view. The diagrams, in particular the details of the design and arrangement of the tabs, are not to scale.

Figure 6:
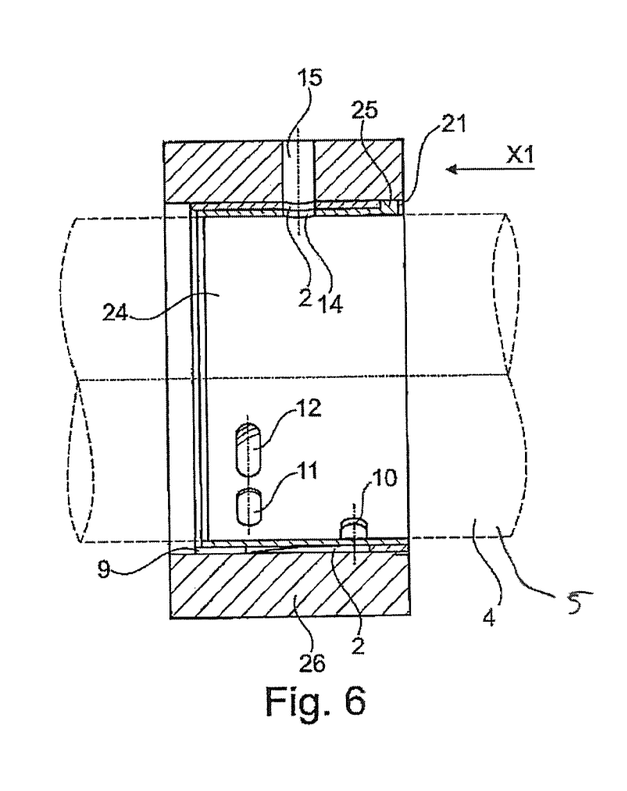
FIG. 6 is a longitudinal sectional view taken generally along line VI-VI through the device in FIG. 5.

FIG. 6 shows a longitudinal section through device 23 along axis of symmetry 3 of device 23. Device 23 exhibits element 4, which is shaft 5. Device 23 is further provided with element 6, which is sleeve 9. Sleeves 24 and 9 are disposed between element 4 and housing 26. Shaft 5 is movably disposed to be pivotable about axis of symmetry 3 or rotatable relative to housing 26. Sleeve 24 surrounds shaft 5 completely on the circumferential side, and is surrounded by sleeve 9. Sleeve 9 is completely surrounded by housing 26 on the circumferential side. Sleeves 24 and 9 are seated inside one another, and as a composite on shaft 5, with an interference fit, by means of which they are pivotable about axis of symmetry 3. Sleeve 24 is provided with radial clearance holes 10, 11, 12 and 13, which correspond to not depicted channels or oil bores in shaft 5. Clearance hole 10 leads, for example, into channel 2 that is configured as a clearance hole in sleeve 9. Clearance hole 13 opens into channel 14, which extends in circumferential direction in sleeve 9, and which opens into oil bore 15 that is disposed in housing 26 circumferentially offset to clearance hole 13.

With two mutually adjacent tabs 25, sleeve 24 engages into aperture 21 on sleeve 9 in a positive-locking manner. By means of the resulting positive fit, element 6 is secured on sleeve 24 and against rotation relative to sleeve 24, and is secured on shaft 5 by means of the press fit.

Figures 7, 8, 9:
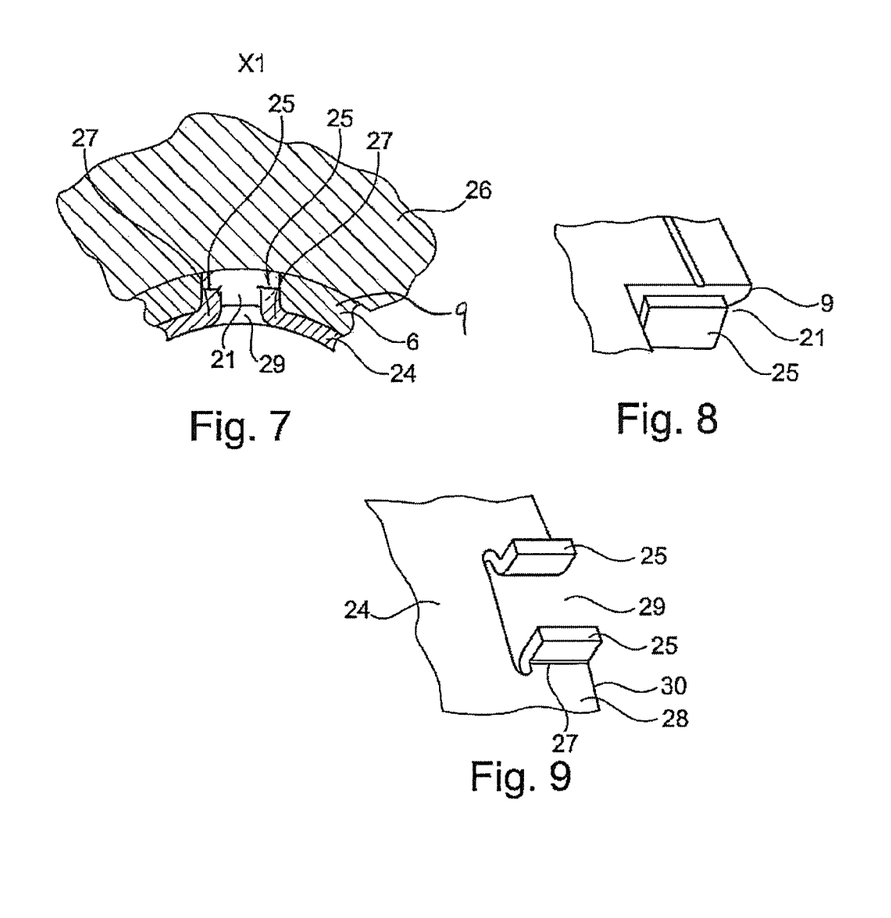
FIG. 7 is a fragmentary view of the device taken generally from perspective X1 in FIG. 6.
FIG. 8 is a detailed view of the positive-locking means of securing the sleeves of FIG. 5.
FIG. 9 is a view of the sleeve of FIG. 7.

FIG. 7 shows a not to scale detailed representation of the view X1 from FIG. 6. The diagrams, in particular the details of the design and arrangement of the tabs, are not to scale.

FIG. 9 shows a detail of sleeve 24 with tabs 25. Tabs 25 are punched from the sheet metal of sleeve 24, whereby each of tabs 25 extends at root 27 from wall 28 of sleeve 24. Two tabs 25 lie across from one another tangential to the circumference of sleeves 24 and 9, at common radial aperture 29, that is configured on edge 30 of sleeve 24 and was created in the course of the production of tabs 25 by punching and bending of tabs 25 out of wall 28 of sleeve 24. Roots 27, which define the edges of aperture 29 in two circumferential directions, are the bending edges, around which tabs 25 were radially bent out of sleeve 24 in the course of the production of the tabs. In an axial direction, the edge of aperture 29 is bounded by the material of sleeve 24. Edge 30 of sleeve 24 is interrupted on the circumferential side by aperture 29. In the detail view of sleeve 24, FIG. 9 shows that tabs 25 end at aperture 29 at the axial height of edge 30 of sleeve 24.

FIG. 8 shows a detail of the positive-locking means of securing sleeve 24 in sleeve 9.

At the height of aperture 19, sleeve 9 exhibits recess 21. Together tabs 25 engage radially into recess 21 in a positive-locking manner, but not through it, and therefore do not extend radially above sleeve 9.

Figures 10, 11, 12, 13:
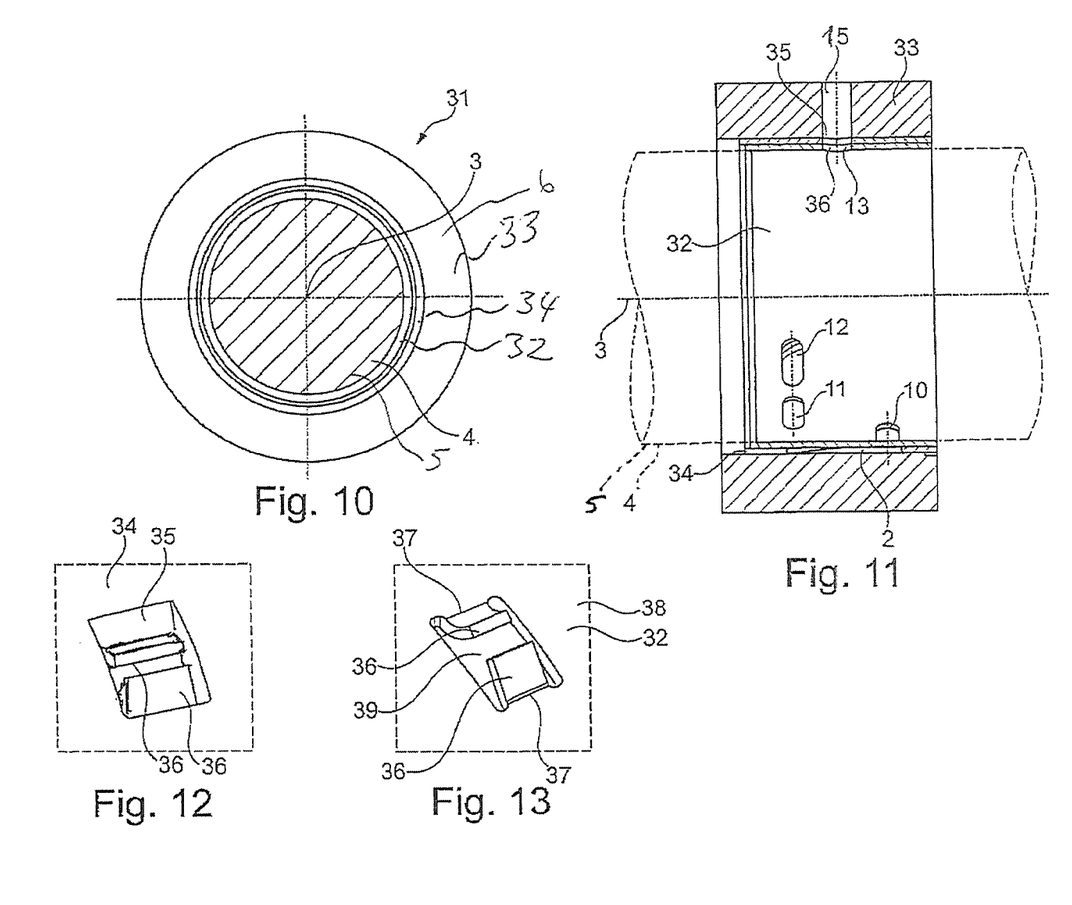
FIG. 10 is a front partial cross-sectional view of a device according to the invention.
FIG. 11 is a longitudinal sectional view taken through the device of FIG. 10.
FIG. 12 is a detailed view of the positive-locking means of securing the sleeves of FIG. 10.
FIG. 13 is a detailed view of a sleeve of FIG. 10.

FIG. 10 shows device 31 in a front view.

FIG. 11 shows a longitudinal section through device 31 along axis of symmetry 3 of device 31.

Device 31 exhibits element 4, which is shaft 5. Device 31 is further provided with element 6, which is sleeve 34. Sleeves 32 and 34 are disposed between element 4 and housing 33. Shaft 5 is movably disposed to be pivotable about axis of symmetry 3 or rotatable relative to housing 33. Sleeve 32 surrounds shaft 5 completely on the circumferential side, and is surrounded by sleeve 34. Sleeve 34 is completely surrounded by housing 33 on the circumferential side. Sleeves 32 and 34 are seated inside one another, and as a composite in housing 33, with an interference fit, a transition fit or a clearance fit. Sealing rings may be disposed between the sleeves as well. Sleeve 32 is provided with radial clearance holes 10, 11, 12 and 13, which correspond to not depicted channels or oil bores in shaft 5. Clearance hole 10 leads, for example, into channel 2 that is configured as a clearance hole in sleeve 34. Clearance hole 13 opens into recess 35, which is configured in sleeve 34 and leads to oil bore 15 in housing 33.

With two mutually adjacent tabs 36, sleeve 32 is secured on element 6 in a positive-locking manner against rotation about axis of symmetry 3 and, in an axial direction, against displacement, by snapping tabs 36 into recess 35 of sleeve 34 in a positive-locking manner.

FIG. 13 shows a detail of sleeve 32 with tabs 36.

Tabs 36 are punched from the sheet metal of sleeve 32, whereby each of tabs 36 extends at root 37 from wall 38 of sleeve 32. Two tabs 36 lie across from one another in tangential direction at common radial aperture 39 and are inclined toward one another. Aperture 39, bounded on all sides by wall 38 of sleeve 32, was created, in the course of the production of tabs 36, by punching and bending tabs 36 out of wall 38. Roots 37, which tangentially define the edges of aperture 39, are the bending edges around which tabs 36 were radially bent out of sleeve 32 in the course of the production of tabs 36.

FIG. 12 shows a detail of the positive-locking means of securing with which sleeves 32 and 34 are secured to one another. At the height of aperture 39, sleeve 34 exhibits recess 35. Tabs 36 engage radially into recess 35 in a positive-locking manner.

Figure 14:
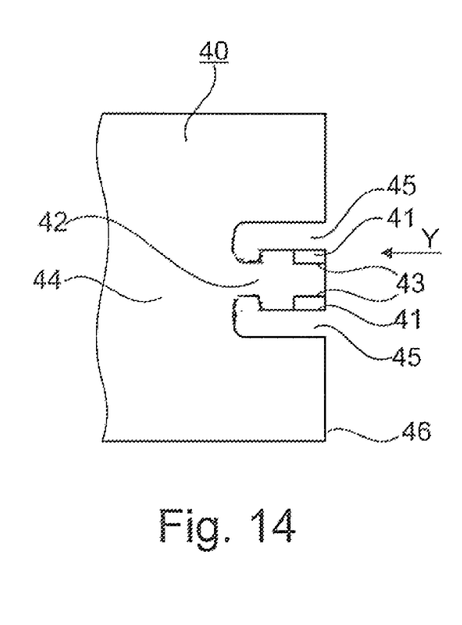
FIG. 14 is a detailed of a sleeve of a device according to the invention.

FIG. 14 shows a detail of sleeve 40 for a device according to the invention.

Figure 15:
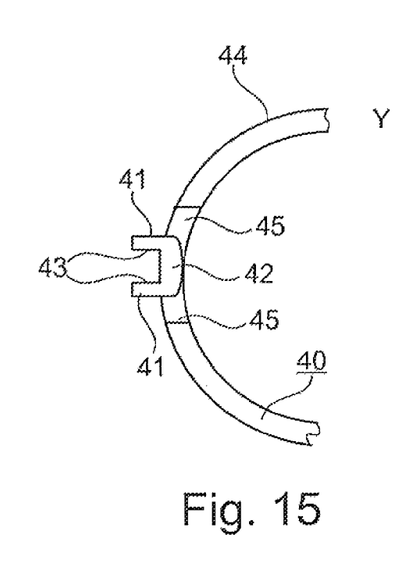
FIG. 15 is a view Y of the detail shown in FIG. 14.

FIG. 15 shows the view Y of the detail of FIG. 14.

For a positive-locking means of securing to one of the elements, sleeve 40 exhibits two tabs 41, which extend from tongue 42. Tabs 41 and tongue 42 are made of the material of wall 43 of sleeve 40. Tongue 42 extends axially from wall 43 and is bounded on both sides by apertures 45. Tabs 41 are bent at roots 44 radially outward from the edge of tongue 42. Each tab 41 or each root 44 is tangentially adjoined by one aperture 45. On the circumferential side, edge 46 of sleeve 40 is interrupted by apertures 45.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMERALS

1 Device
2 Channel
3 Symmetry axis
4 First element
5 Shaft
6 Second element
7 Housing
8 Sleeve
9 Sleeve
10 Clearance hole
11 Clearance hole
12 Clearance hole
13 Clearance hole
14 Channel
15 Oil bore
16 Tab
17 Root
18 Wall
19 Aperture
20 Edge
21 Recess
22 Recess
23 Device
24 Sleeve
25 Tab
26 Housing
27 Root
28 Wall
29 Aperture
30 Edge
31 Device
32 Sleeve
33 Housing
34 Sleeve
35 Recess
36 Tab
37 Root
38 Wall
39 Aperture
40 Sleeve
41 Tab
42 Tongue
43 Root
44 Wall
45 Aperture
46 Edge

What is claimed is:

1. A device for conducting oil in a vehicle gearbox, comprising:
at least two mutually movable elements and first and second sleeves made of sheet steel, and the sleeves are disposed between the elements, and at least one of the elements and one of the sleeves are secured to one another in a positive-locking manner and whereby a first element of the elements is at least partially surrounded by the first sleeve and a second element of the elements at least partially surrounds the second sleeve and the first element, and the first sleeve is at least partially surrounded by the second sleeve
wherein the first sleeve exhibits at least two mutually adjacent tabs, which engage in at least one recess of one of the elements, whereby the sleeve and at least one of the elements are secured to one another in a positive-locking manner via the tabs, and whereby each of the tabs extends on a root from the wall of the first sleeve and a radial aperture in the wall of the first sleeve adjoins each of the roots between the roots such that the radial aperture is circumferentially between the tabs, whereby the tabs lie across from one another tangentially to the circumference of the sleeve and a volume of the aperture is at least as large as a volume of the tabs lying across from one another.

2. The device of claim 1, wherein the two mutually adjacent tabs jointly engage in a recess of one of the elements in a positive-locking manner.

3. The device of claim 2, wherein the sleeves are secured on the second element via the tabs in a positive-locking manner.

4. The device of claim 1, wherein a first material of the sleeves exhibits a first coefficient of thermal expansion, which differs from a second coefficient of thermal expansion of a second material, whereby at least one of the elements is at least partially made of the second material.

5. The device of claim 1, wherein an aperture adjoins the roots, which in both circumferential directions of the sleeves is in each case bounded by one of the roots.

6. The device of claim 1, wherein in circumferential direction each root is adjoined by an aperture, whereby the roots of the two adjacent tabs tangentially or circumferentially extend through the periphery between two of the apertures.

7. The device of claim 1, wherein the tabs end axially with one of two edges that axially bound the sleeves, or stand axially back behind the edge.

8. The device of claim 1, wherein the aperture interrupts an edge which axially bounds the sleeve.

9. A device for conducting oil in a vehicle gearbox, the device comprising:
a shaft;
a housing surrounding the shaft, the housing defining a recess;
a first sleeve radially between the shaft and the housing, and at least partially surrounding the shaft, the first sleeve defining a first aperture; and
a second sleeve radially between the first sleeve and the housing and at least partially surrounding the first sleeve, the second sleeve defining a second aperture aligned with the first aperture;
wherein the first sleeve includes a pair of tabs extending radially outward therefrom and separated by the first aperture, wherein the tabs extend through the second aperture and into the recess of the housing.

10. The device of claim 9, wherein the tabs rotationally lock the first sleeve to the housing.

11. The device of claim 9, wherein the tabs inhibit axial movement of the sleeves relative to the shaft and housing.

* * * * *